(12) United States Patent
Zhang et al.

(10) Patent No.: US 10,464,473 B2
(45) Date of Patent: Nov. 5, 2019

(54) VEHICLE DISPLAY SYSTEM HAVING A RATIONALE INDICATOR

(71) Applicant: Nissan North America, Inc., Franklin, TN (US)

(72) Inventors: Jingyi Zhang, San Jose, CA (US); Melissa Cefkin, San Jose, CA (US); Erik Vinkhuyzen, Morgan Hill, CA (US)

(73) Assignee: Nissan North America, Inc., Franklin, TN (US)

( * ) Notice: Subject to any disclaimer, the term of this patent is extended or adjusted under 35 U.S.C. 154(b) by 262 days.

(21) Appl. No.: 15/357,736

(22) Filed: Nov. 21, 2016

(65) Prior Publication Data

US 2018/0141489 A1    May 24, 2018

(51) Int. Cl.
    *G06F 7/00*      (2006.01)
    *B60Q 1/50*      (2006.01)
    *B60W 50/14*     (2012.01)
    *B60W 30/095*    (2012.01)
    *B60W 30/18*     (2012.01)
    *B60Q 1/00*      (2006.01)

(52) U.S. Cl.
    CPC ............ *B60Q 1/50* (2013.01); *B60Q 1/0035* (2013.01); *B60W 30/095* (2013.01); *B60W 30/18154* (2013.01); *B60W 50/14* (2013.01); *B60W 2050/146* (2013.01); *B60W 2550/10* (2013.01)

(58) Field of Classification Search
    None
    See application file for complete search history.

(56) References Cited

U.S. PATENT DOCUMENTS

| | | | |
|---|---|---|---|
| 5,963,345 A | 10/1999 | Smith | |
| 6,417,764 B2* | 7/2002 | Tonkin | B60Q 1/444 180/282 |
| 7,095,318 B1 | 8/2006 | Bekhor | |
| 8,954,252 B1 | 2/2015 | Urmson et al. | |
| 9,211,837 B2 | 12/2015 | Lettstrom et al. | |
| 9,459,623 B1 | 10/2016 | Raghu | |
| 9,672,719 B1* | 6/2017 | Hollenstain | G08B 21/18 |
| 10,144,397 B2* | 12/2018 | Lim | B60T 7/22 |
| 2005/0046584 A1* | 3/2005 | Breed | B60C 11/24 340/13.31 |

\* cited by examiner

*Primary Examiner* — Adam M Alharbi
(74) *Attorney, Agent, or Firm* — Global IP Counselors, LLP

(57) ABSTRACT

An autonomous vehicle includes a vehicle body, at least one detector, at least one display and at least one controller. The at least one detector is configured to detect a presence of an external object within a vicinity of the vehicle. The at least one display is supported on the vehicle body. The at least one controller is programmed to determine the presence of the external object upon detection of the external object by the detector. The controller is further programmed to display a rationale indicator on the display to a remote party within the vicinity of the vehicle based on a detection result of the detector indicating the presence of the external object. The rationale indicator is an indication of an external condition occurring in the vicinity of the vehicle.

18 Claims, 12 Drawing Sheets

US 10,464,473 B2

VEHICLE DISPLAY SYSTEM HAVING A RATIONALE INDICATOR

BACKGROUND

Field of the Invention

The present invention generally relates to a vehicle having a controller and a vehicle state indication system.

Background Information

Conventional vehicle display systems include indication systems that attempt to communicate messages to remote parties, such as other drivers, pedestrians and bicyclists in proximity to the vehicle. For example, many vehicles include brake lights to indicate the braking status of the vehicle and turn signal indicators to indicate the intent of the vehicle to turn a specific direction. Vehicles can also be equipped with indication systems that indicate vehicle intent to remote parties. For example, these conventional systems may display a message that the vehicle is "braking" or "stopped." Other conventional indication systems can detect the presence of a pedestrian and then a display a message advising the pedestrian with messages such as "please walk" or "stop".

SUMMARY

It has been discovered that in order to increase transparency and predictability around vehicles, a rationale indication system is desired. This system can externally communicate a condition of the vehicle surroundings to potential remote parties.

In view of the state of the known technology, one aspect of the present disclosure is to provide an autonomous vehicle comprising a vehicle body, at least one detector, at least one display and at least one controller. The at least one detector is configured to detect a presence of an external object within a vicinity of the vehicle. The at least one display is supported on the vehicle body. The at least one controller is programmed to determine the presence of the external object upon detection of the external object by the detector. The controller is further programmed to display a rationale indicator on the display to a remote party within the vicinity of the vehicle based on a detection result of the detector indicating the presence of the external object. The rationale indicator is an indication of an external condition occurring in the vicinity of the vehicle.

In view of the state of the known technology, a second aspect of the present disclosure is to provide an autonomous vehicle comprising a vehicle body, at least one detector, a plurality of displays and at least one controller. The at least one detector configured to detect a presence of an external object within a vicinity of the vehicle. The displays are supported at various locations of the vehicle body. The at least one controller is programmed to determine the presence of the external object upon detection of the external object by the detector and to display a rationale indicator to a remote party on at least a first display. The controller is further programmed to select the first display based on a determination that the external object is substantially within an obstructed viewing area from the perspective of the remote party.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
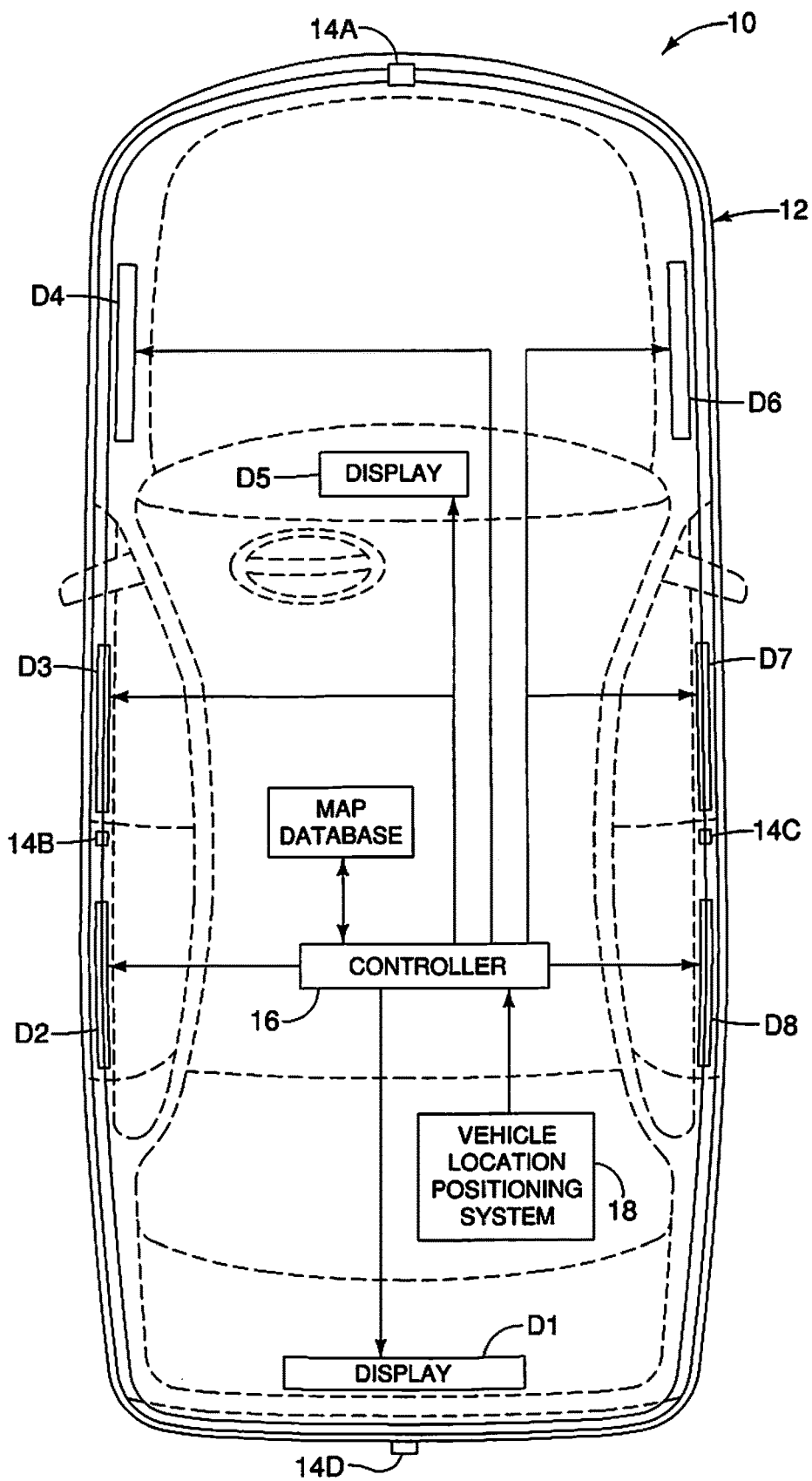
FIG. 1 is a schematic plan view of a host vehicle equipped with a controller, a plurality of detectors and a plurality of displays to display a rationale indicator, in accordance with an illustrated embodiment.

Referring initially to FIG. 1, a host vehicle 10 in accordance with a first embodiment is illustrated. For the sake of simplicity, the host vehicle 10 will be simply referred to hereinafter as the vehicle 10. The term "host vehicle" as used herein refers to vehicle equipped with an on-board vehicle state indication system. The vehicle 10 basically comprises, among other things, a vehicle body 12, at least one detector (e.g., a plurality of detectors 14A-14D are illustrated), at least one display (e.g., a plurality of displays D1-D8 are illustrated), at least one controller 16 (e.g., only one is illustrated) and a vehicle location positioning system 18. The detectors 14A-14D, the displays D1-D8 and the controller 16 are interconnected to illustrate one example of an on-board vehicle state indication system that is installed on the vehicle body 12 of vehicle 10.

The controller 16 is programmed to communicate with the displays D1-D8, the detectors 14A, 14B, 14C and 14D and the vehicle location positioning system 18 in order to display a rationale indicator 20 on one or more of the displays D1-D8. The term "rationale indicator" as used herein refers to an indication of the cause of a host vehicle condition (e.g., stopped at a crosswalk) due to an external condition of the host vehicle. In the illustrated embodiment, the controller 16 is programmed to display at least one image on the displays D1-D8 indicative of an external condition to convey the rationale of the rationale indicator 20 to a remote party 22 within a vicinity of the vehicle 10. The rationale indicator 20 is based on a detection result of the detectors 14A, 14B, 14C and 14D and indicates the presence of an external object P. The rationale indicator 20 will be further discussed below.

The vehicle 10 is preferably an autonomous vehicle, but can be any suitable vehicle as desired. Also, while the vehicle 10 is illustrated as a sedan, it will be apparent to one skilled in the art that the vehicle 10 can a variety of types of vehicles equipped having a display system. In the illustrated embodiment, the on-board vehicle state indication system includes a plurality of detectors (i.e., the detectors 14A, 14B, 14C and 14D) and a plurality of displays (i.e., the displays D1-D8). Of course, it will be apparent to those skilled in the art from this disclosure that the vehicle 10 can be equipped with a single detector and a single display. Also, while the controller 16 is illustrated as a single unitary component with one or more processors, it will be apparent to one skilled in the art from this disclosure that the vehicle 10 can include a plurality of controllers located at different locations on the vehicle 10 as needed and/or desired to control the detectors 14A, 14B, 14C and 14D and the displays D1-D8.

The detectors 14A, 14B, 14C and 14D are supported at various positions of the vehicle body 12 to detect a presence of the external object P within the vicinity of the vehicle 10, as will be further discussed below. The detectors 14A, 14B, 14C and 14D are also preferably configured to detect a plurality of external objects P within the vicinity of the vehicle 10 upon starting the vehicle 10. The detectors 14A, 14B, 14C and 14D are in electronic communication with the controller 16 to transmit detection information to the controller 16 upon detection of the external object P or objects. The detectors 14A, 14B, 14C and 14D are also configured to receive a command signal from the controller 16 to initiate detection of the vehicle vicinity based on information provided by the vehicle location positioning system 18 that is also in communication with the controller 16.

The controller 16 includes a processor and other conventional components such as an input interface circuit, an output interface circuit, and storage devices, as will be further discussed below. The controller 16 is programmed to determine the presence of the external object P upon detection of the external object P by the detectors 14A, 14B, 14C and 14D. In particular, the controller 16 is programmed to determine whether the external object P is within or adjacent to a travel path 24 of the vehicle 10, which will be further discussed below. In other words, the controller 16 is programmed to process the detection information transmitted by the detectors 14A, 14B, 14C and 14D, to determine the presence of the external object P, to determine the rationale indicator 20 to be displayed and to transmit a command signal to the displays D1-D8 to display the rationale indicator 20 to the remote party 22. Preferably, the displays D1-D8 display the rationale indicator 20 to convey a condition of an obstructed viewing area to the remote party 22, which will be further discussed below.

In the illustrated embodiment, the remote party 22 can include other drivers, pedestrians or bicyclists in the vicinity of the vehicle 10. Preferably, the external object P is one of another driver, a pedestrian, and a cyclist within the vicinity of the vehicle 10. In the illustrated embodiment, the external object P can include any kind of obstacle or potential obstacle in the travel path 24 of the vehicle 10, such as a pedestrian, another vehicle, cyclist, or obstruction in or adjacent the road (i.e., traffic cone, accident, road blocks, construction zones, etc.). For simplicity, the terms "remote party" and the "external object" will be used generically in this disclosure in describing the detecting of obstacle or potential obstacle and the displaying of the rationale indicator 20 to people or vehicles.

Figure 3:
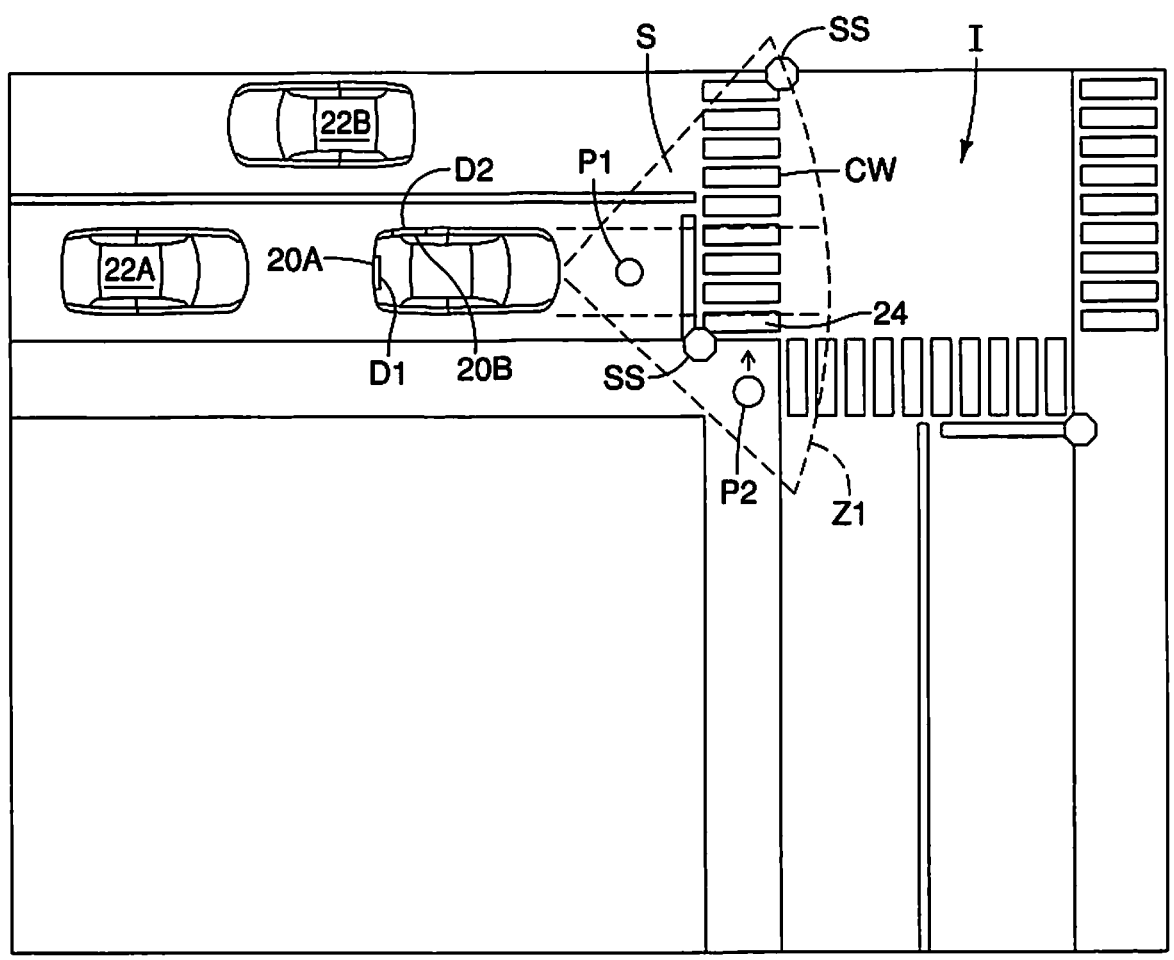
FIG. 3 is a schematic plan view of the host vehicle illustrated in FIGS. 1 and 2 approaching a crosswalk with external objects in the vehicle vicinity.

For example, referring to FIG. 3, a first remote party 22A located rearward of the vehicle 10 can view a rationale indicator 20A on the display D1 regarding information about an external object P1, which is located in an obstructed viewing area from the perspective of the first remote party 22A. The external object P1 can be an accident, traffic cone, ditch, or other type of obstruction. A second remote party 22B located adjacent a side of the vehicle 10 can view a rationale indicator 20B on the display D2 regarding information about an external object P2, which is located in an obstructed viewing area from the perspective of the second remote party 22A. The external object P2 can be a pedestrian or cyclist either adjacent a crosswalk CW or about to cross the crosswalk CW. The remote parties 22A and 22B, upon seeing the rationale indicators 20A and 20B, will be more informed as to the surroundings and the external condition of the vehicle 10. The detection of external objects P and the displaying of the rationale indicator 20 will be further discussed below.

Figure 2:
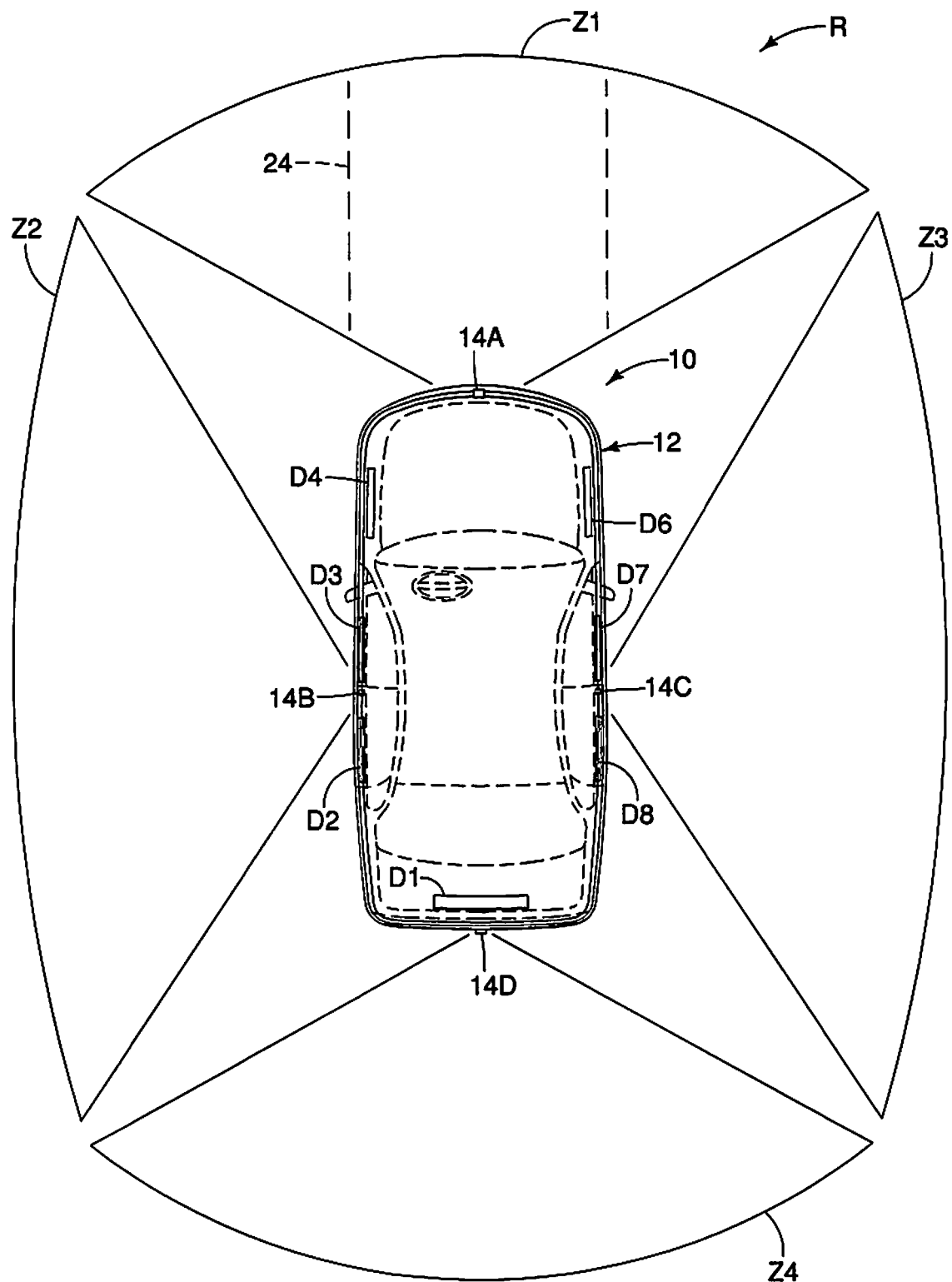
FIG. 2 is a schematic plan view of the host vehicle illustrated in FIG. 1 showing the detection zones of the detectors and the vehicle travel path.

As shown in FIGS. 1 and 2, the detectors 14A, 14B, 14C and 14D and the displays D1-D8 are supported at various locations of the vehicle body 12. In the illustrated embodiment, the displays D1-D8, the vehicle location positioning system 18 and the controller 16 are shown to be electrically connected, while the detectors 14A, 14B, 14C and 14D are illustrated to be in wireless communication with the controller. However, it will be apparent to one skilled in the art that all of these components can be in wireless communication with each other or electrically connected, as needed and/or desired.

The detectors 14A, 14B, 14C and 14D will now be discussed. As illustrated in FIG. 1, the detectors 14A, 14B, 14C and 14D are preferably mounted externally on a front portion, a rear portion and on each of the side portions of the vehicle 10. While four detectors 14A, 14B, 14C and 14D are shown, one mounted to the front, one to the rear and one on each side of the vehicle 10, it will be apparent to one skilled in the art from this disclosure that there could be additional or fewer detectors as needed and/or desired. Also, the detectors 14A, 14B, 14C and 14D can be mounted on any suitable external portion of the vehicle body 12, including the front and rear bumpers, the external mirrors or any combination of suitable areas.

As stated, the detectors 14A, 14B, 14C and 14D are configured to detect the external object P in the vicinity of the vehicle 10. In the illustrated embodiment, the vicinity of the vehicle 10 is defined as a detection range R of the vehicle 10, which is a range of detection for a conventional vehicle detector that is well known in the art. Typically, the detection range R of a conventional vehicle detector includes a range up to approximately 25 feet. As shown in FIG. 2, a schematic detection range R of the vehicle 10 is illustrated with four detection zones Z1, Z2, Z3 and Z4, each of the detection zones Z1, Z2, Z3 and Z4 corresponding to a detection zone for one of the detectors 14A, 14B, 14C and 14D that is illustrated. The detection zones Z1, Z2, Z3 and Z4 of the illustrated embodiment are approximate detection zones shown for illustrative purposes, thus certain areas are illustrated near the vehicle as not being within one of the detection zones Z1, Z2, Z3 and Z4. However, it will be apparent to those skilled in the art from this disclosure that the vehicle 10 can be equipped with detectors such that the entirety of the area in proximity to the vehicle 10 is within one of the detection zones Z1, Z2, Z3 and Z4. Of course, it will also be apparent to one skilled in the art that the vehicle 10 can be equipped with any number of detectors 14A, 14B, 14C and 14D such that there will be additional or fewer detection zones Z1, Z2, Z3 and Z4 that will overlap as needed and/or desired.

The detectors 14A, 14B, 14C and 14D can also be any type of conventional vehicle sensor as desired. For example, the detectors 14A, 14B, 14C and 14D can include unidirectional or omnidirectional cameras that take moving or still images of the vehicle 10 surroundings which are transmitted to the controller 16 for processing. In addition, the detectors 14A, 14B, 14C and 14D can be capable of detecting the speed, direction, yaw, acceleration and distance of the vehicle 10 relative to a remote object. The detectors 14A, 14B, 14C and 14D can include infrared detectors, ultrasonic detectors, radar detectors, photoelectric detectors, magnetic detectors, acceleration detectors, lasers or any combination thereof. The detectors 14A, 14B, 14C and 14D can also include object-locating sensing devices including range detectors, such as FM-CW (Frequency Modulated Continuous Wave) radars, pulse and FSK (Frequency Shift Keying) radars, sonar and Lidar (Light Detection and Ranging) devices. Thus, the detectors 14A, 14B, 14C and 14D can include any type and/or combination of detectors mentioned to enable detection of external objects P.

As stated above, the detectors 14A, 14B, 14C and 14D can be configured to initiate detection of the vehicle vicinity based on information provided from the vehicle location positioning system 18. In the illustrated embodiment, the vehicle location positioning system 18 is a Global Positioning System (GPS). The initiation of detection by the detectors 14A, 14B, 14C and 14D based on vehicle location will be further discussed below.

The displays D1-D8 will now be discussed. In the illustrated embodiment, the displays D1-D8 can include display panels mounted on different locations of the vehicle body 12 in a conventional manner. In the illustrated embodiment, eight of the displays D1-D8 are illustrated, with each being located at a different location on the vehicle body 12. It will be apparent to those skilled in the art from this disclosure that the vehicle 10 can be equipped with additional or fewer displays located at a variety of locations of the vehicle body 12 to display the rationale indicator 20 as needed and/or desired.

The displays D1-D8 can include any type of display panel as desired to display the rationale indicator 20. For example, the displays D1-D8 can be light-emitting diode displays (LED), light crystal displays (LCD), or dashboard panels configured to display lights, text 26, images or icons 28. Alternatively, the displays D1-D8 can include a heads-up display. Thus, the displays D1-D8 can be directly mounted onto the vehicle body 12 structure, as seen in FIGS. 5 to 11, or mounted onto the windows panels, as seen in FIG. 12. The displays D1-D8 can also include any combination of the above-mentioned display types as needed and/or desired. Additionally, the displays D1-D8 can have different shapes and sizes to accommodate the shape and contours of the vehicle body 12.

Further, as the displays D1-D8 are mounted on various locations of the vehicle body 12, the displays D1-D8 can be configured to displays D1-D8 different images depending on the external condition in the vehicle vicinity. For example, as seen in FIG. 3, the first display D1 can be configured to display the first rationale indicator 20A and the second display D2 can be configured to display the second rationale indicator 20B that is different from the first rationale indicator 20. The first display D1 can display the first rationale indicator 20A simultaneously as the second display D2 displays the second rationale indicator 20B. The displaying of different rationale indicators by the displays D1-D8 will be further discussed below.

The displays D1-D8 can display text to convey the rationale of the rationale indicator 20. For example, the displays D1-D8 can display various types of text as seen in FIGS. 5 to 10 to convey the rationale of the rationale indicator 20. It will be apparent to one skilled in the art from this disclosure that the text illustrated in these Figures are merely examples and that the text displayed by the displays D1-D8 and that the text is not limited to these examples. The controller 16 can be programmed with a bank of messages that can be conveyed as the rationale indicator 20.

Figure 11:
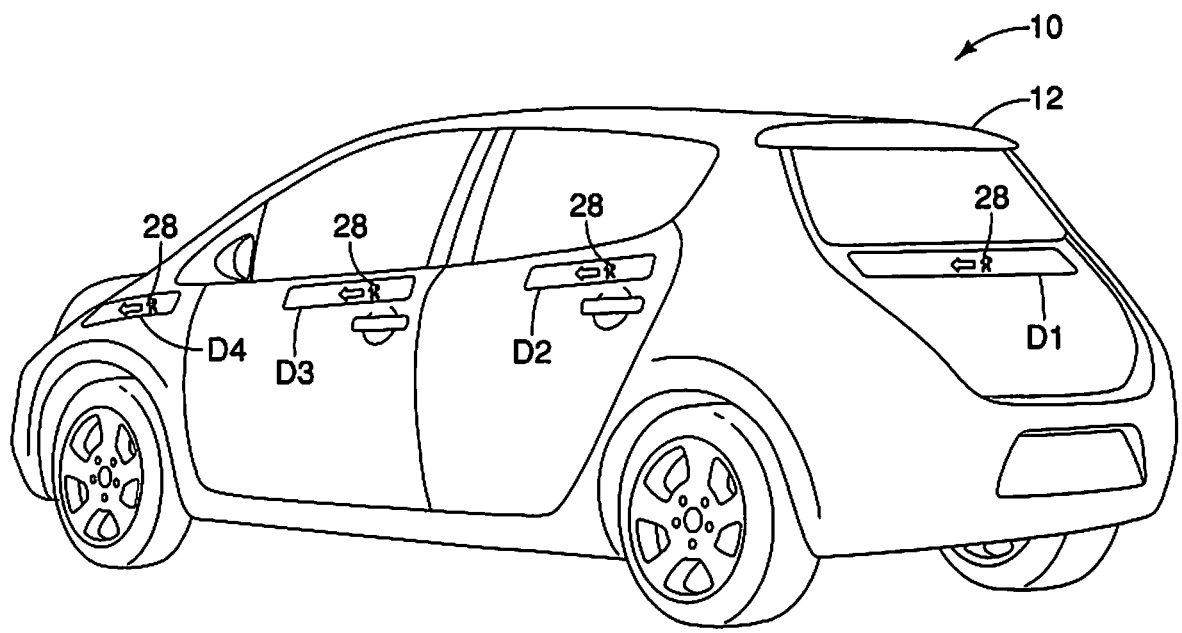
FIG. 11 is a rear perspective view of the host vehicle illustrated in FIGS. 1 to 10 displaying a moving icon as an example of the rationale indicator on the displays.
Figure 12:
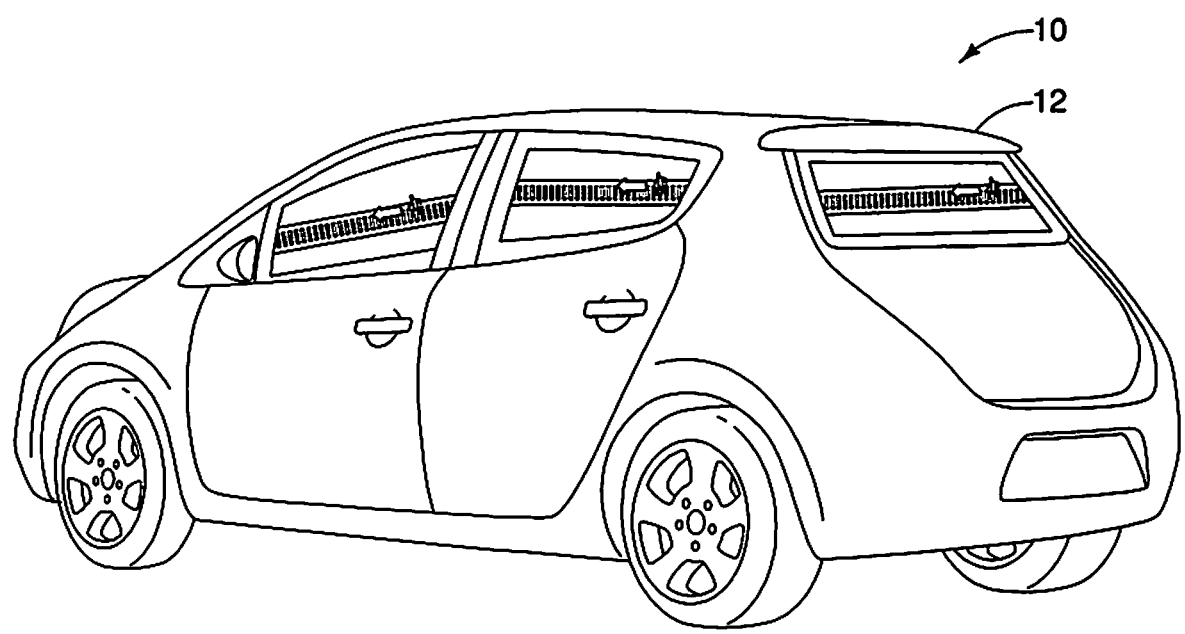
FIG. 12 is a rear perspective view of the host vehicle of FIGS. 1 to 11 with the displays supported on the vehicle windows.

Additionally, the displays D1-D8 can be configured to display a moving image to convey the rationale indicator 20, as seen in FIGS. 11 and 12. That is, the controller 16 is programmed to display a moving image on the displays D1-D8 corresponding to a movement of the external object P as the rationale indicator 20. For example, the controller 16 is programmed to display lights on the displays D1-D8 in a direction along the display screen that corresponds to a direction of movement of the external object P on the displays D1-D8. The lights can have a plurality of colors, each color corresponding with a particular message. For example, a series of green lights lit up along the display from the left to right to indicate that a pedestrian crossing from a direction left from the vehicle 10 towards the right of the vehicle 10. Alternatively, a series of yellow lights lit up along the display from left to right can mean a remote vehicle crossing in the direction from the left of the vehicle 10 towards the right of the vehicle 10. The colors discussed herein are merely used as examples, and the colors indicating the state of the vehicle 10 can be any suitable or desired color. It will be apparent to those skilled in the art from this disclosure that the display can display a variety of colors to convey the presence of the external object P and display in a series of directions to convey the movement of the external object P to the remote party 22.

The indication of the rationale indicator 20 by lights is not limited to colors. That is, the indication of the present state of the vehicle 10 can be displayed in any suitable manner, including but not limited to a single color spectrum, a meter system, a brightness indicator, a numerical indicator or in any other manner.

As stated above, the displays D1-D8 can display at least one icon 28 to convey the rationale of the rationale indicator 20. For example, as seen in FIGS. 11 and 12, an image of a pedestrian (conveyed as the icon 28) can be displayed. Also, the image of the pedestrian crossing can be displayed as a movement along the displays D1-D8 in a direction that corresponds with the movement of the pedestrian. Of course, it will be apparent to those skilled in the art from this disclosure that the icon can convey a variety of external objects P, such as a cyclist, vehicle, road blocks, traffic cones, or any other type of obstacle or potential obstacle.

The vehicle location positioning system 18 will now be further discussed. As stated above, the vehicle location positioning system 18 is preferably a GPS that is in communication with the controller 16. The vehicle location positioning system 18 receives and processes a GPS satellite signal to determine positional information related to the vehicle 10 (such as location, speed, acceleration, yaw, and direction, etc.). The vehicle location positioning system 18 is capable of transmitting the positional information to the controller 16. The controller 16 of the illustrated embodiment is also in electric communication with a map database 30 that is, for example, a hard disk drive (HDD) that is configured and arranged to store map data. Examples of map data include information regarding intersections, road routes, etc.

Upon receiving positional information, the controller 16 is programmed to compare the positional information with the map data to determine whether the vehicle 10 is in an area where the presence of the external object P is more likely. In the illustrated embodiment, the controller 16 is programmed to determine that the vehicle 10 is in proximity to at least one of an intersection I and a crosswalk CW based on vehicle 10 location information provided by the vehicle location positioning system 18. Thus, in one embodiment, the vehicle location positioning system 18 can determine when the vehicle 10 is in proximity to a crosswalk CW, an intersection I or any other area in which a remote vehicle or pedestrian (i.e., the external object P) may cross near or in front or the vehicle 10. The detectors 14A, 14B, 14C and 14D are initiated upon approaching at least one of the intersection I and the crosswalk CW. That is, the controller 16 transmits a command signal to the detectors 14A, 14B, 14C and 14D to begin detection of the vehicle vicinity upon determining that the vehicle 10 is in the vicinity of an intersection I or crosswalk CW based on information received from the vehicle location positioning system 18.

Alternatively, the detectors 14A, 14B, 14C and 14D can be configured to undergo continuous detection of the vicinity of the vehicle 10 to determine the presence of the external object P upon starting the autonomous vehicle 10. For example, the vehicle location positioning system 18 can determine whether the vehicle 10 is in proximity to a pedestrian that is crossing a street at an area other than a crosswalk CW (i.e., jay-walking) and the controller 16 can communicate as described above.

The controller 16 and the determination of the rationale indicator 20 will now be discussed. The controller is equipped with internal RAM which can include pre-stored rationale indicators as well as various control data and algorithms to determine the rationale indicator 20 to be displayed upon determining the presence of the external object P. The controller 16 is capable of controlling any of the displays D1-D8 to display particular rationale indicators. It will be apparent to those skilled in the art from this disclosure that the precise structure and algorithms for the controller 16 can be any combination of hardware and software that will carry out the functions of the present invention.

Figure 4:
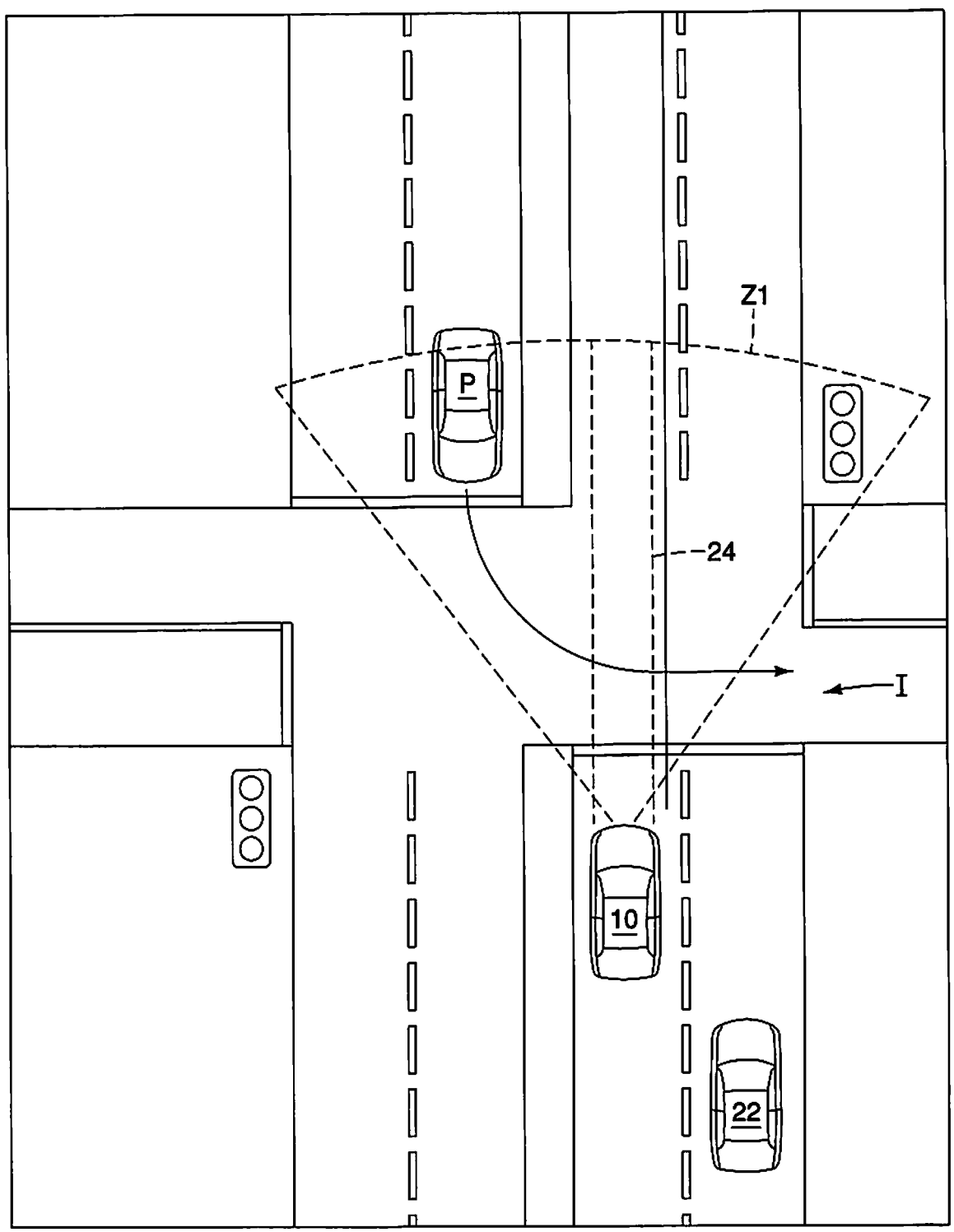
FIG. 4 is a schematic plan view of the host vehicle illustrated in FIGS. 1 to 3 approaching an intersection with an external object in the vehicle vicinity.
Figure 5:
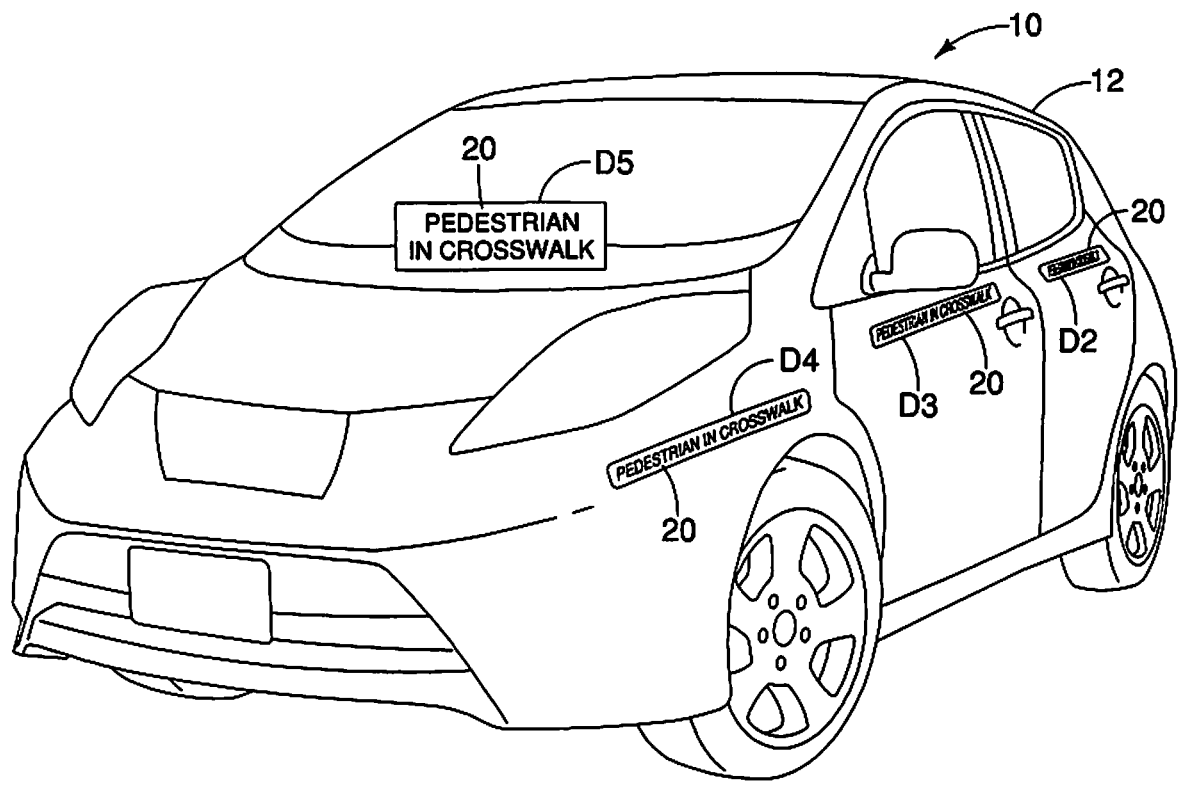
FIG. 5 is a front perspective view of the host vehicle illustrated in FIGS. 1 to 4 displaying a first example of the rationale indicator on the displays.
Figure 6:
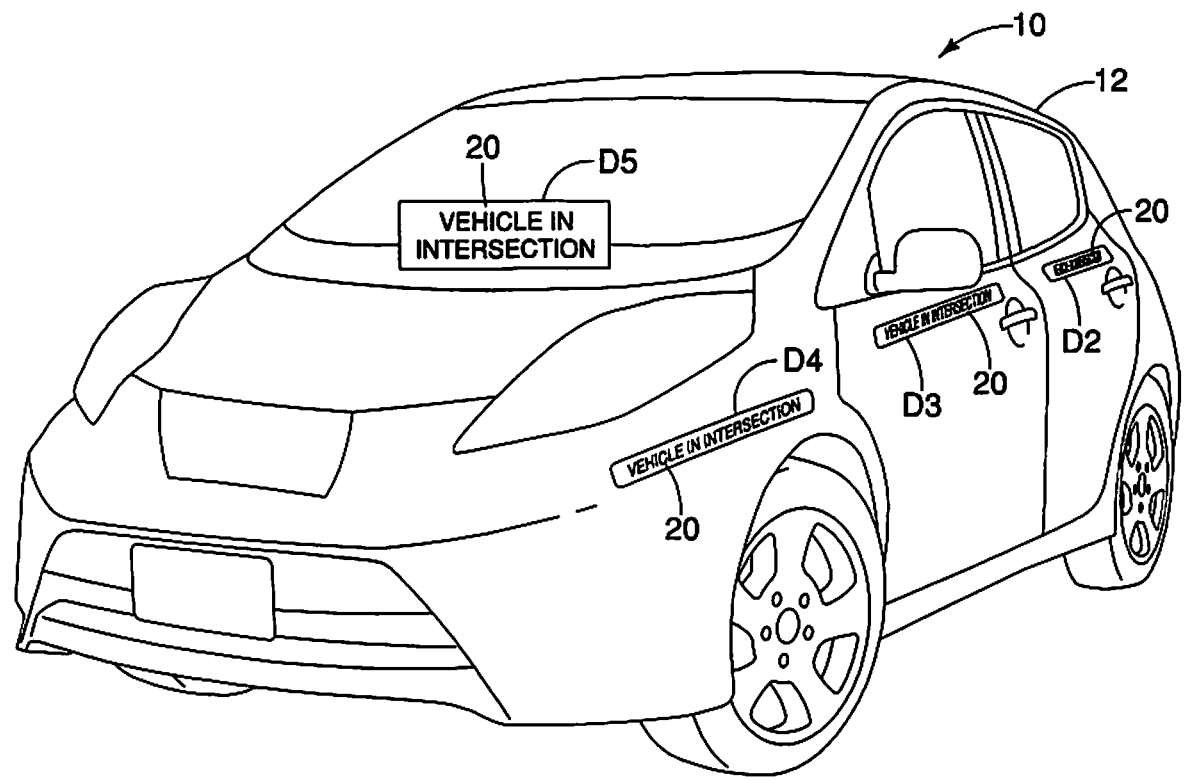
FIG. 6 is a front perspective view of the host vehicle illustrated in FIGS. 1 to 5 displaying a second example of the rationale indicator on the displays.
Figure 7:
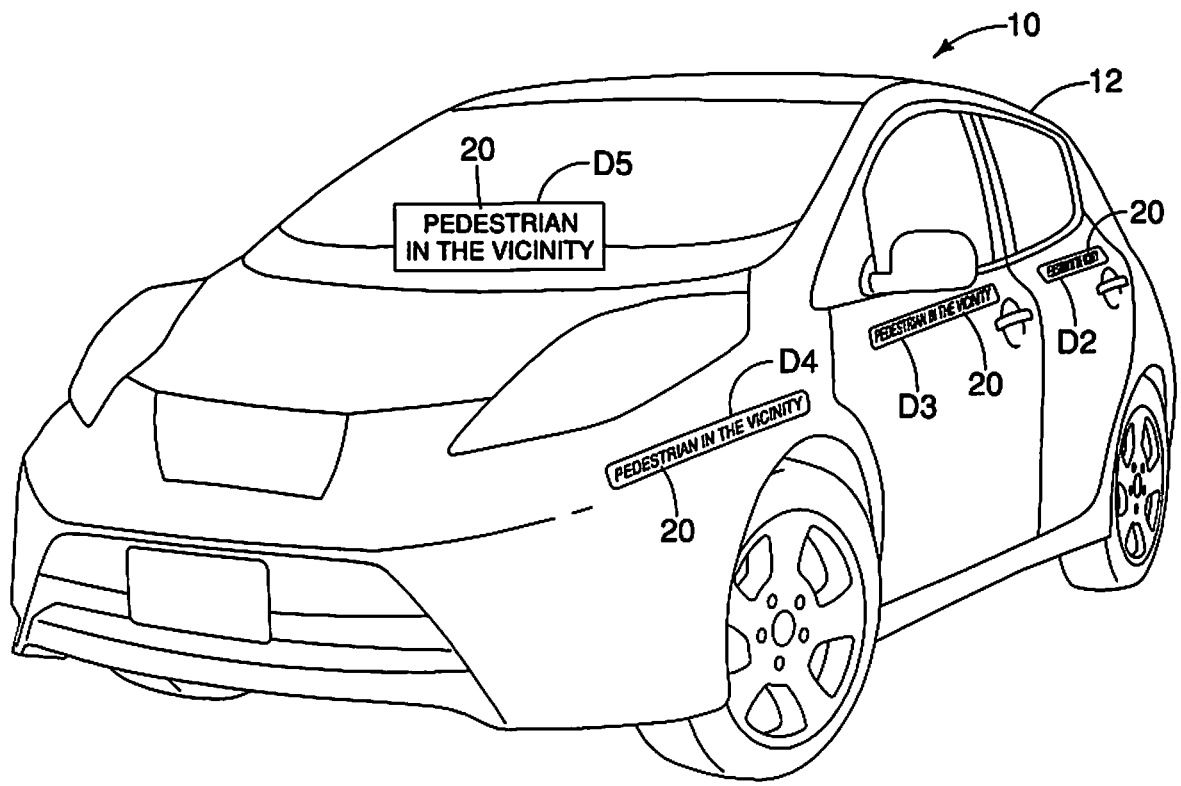
FIG. 7 is a front perspective view of the host vehicle illustrated in FIGS. 1 to 6 displaying a third example of the rationale indicator on the displays.
Figure 8:
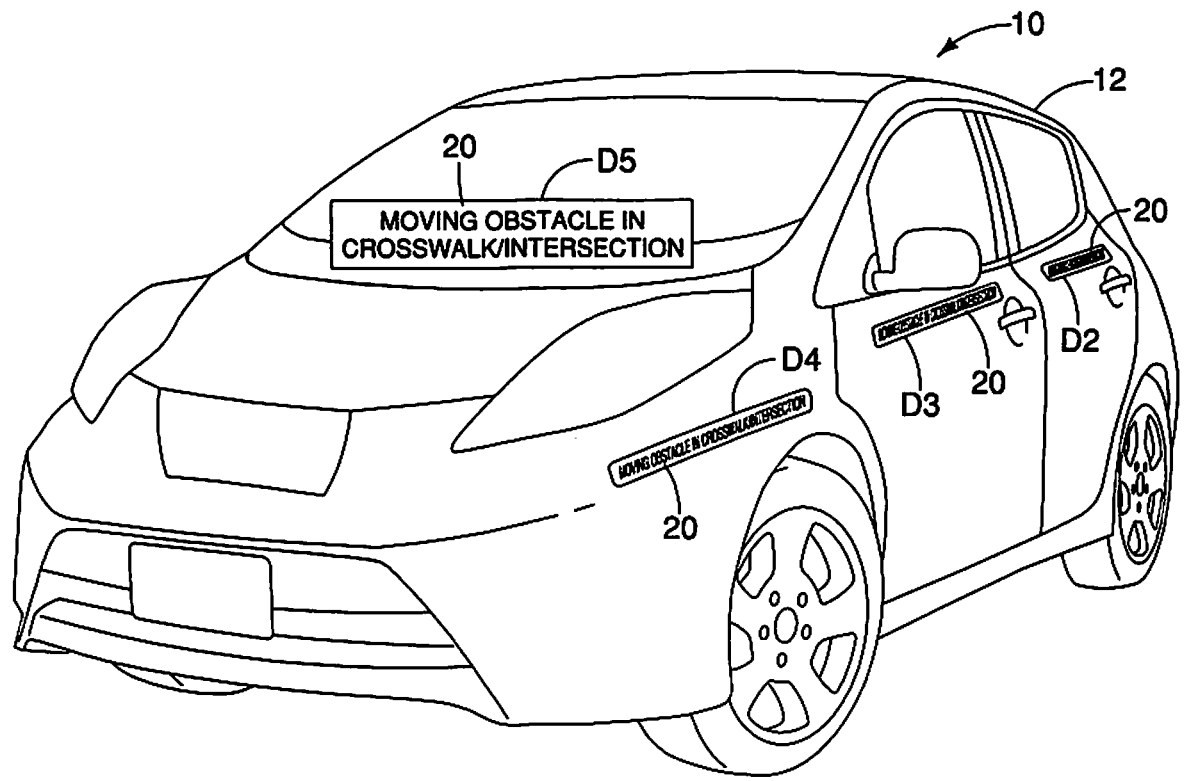
FIG. 8 is a front perspective view of the host vehicle illustrated in FIGS. 1 to 7 displaying a fourth example of the rationale indicator on the displays.
Figure 9:
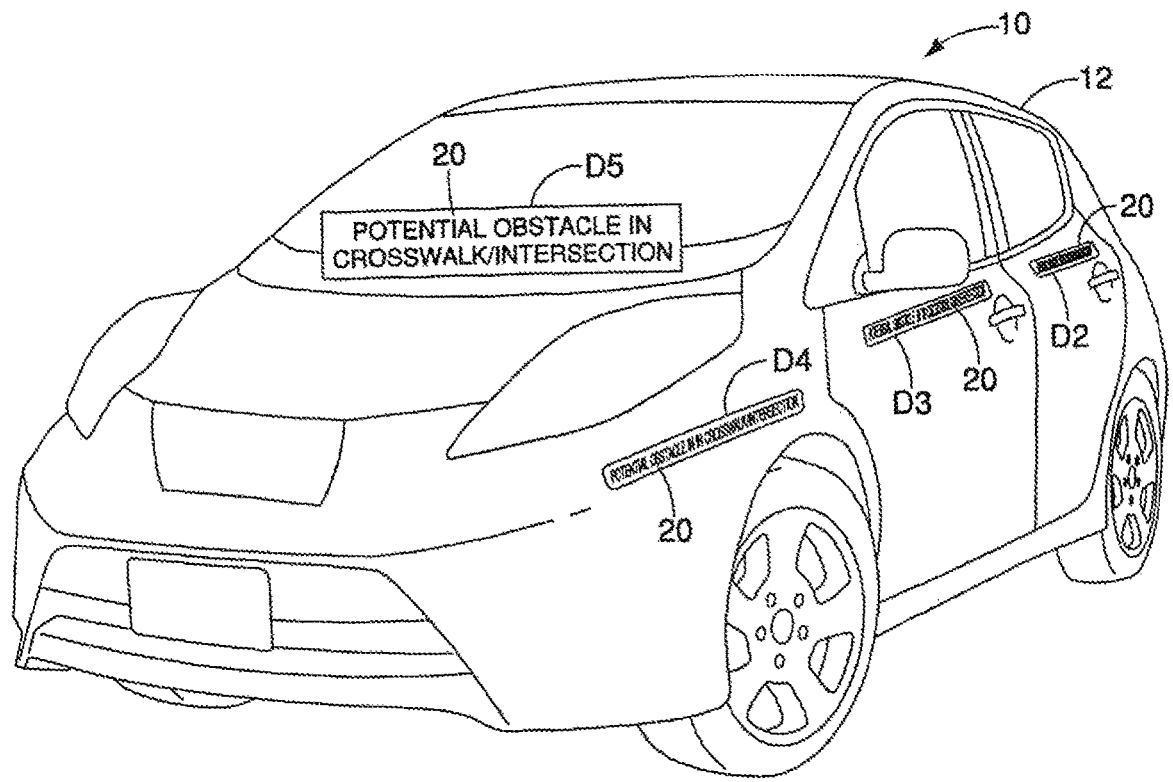
FIG. 9 is a front perspective view of the host vehicle illustrated in FIGS. 1 to 8 displaying a fifth example of the rationale indicator on the displays.
Figure 10:
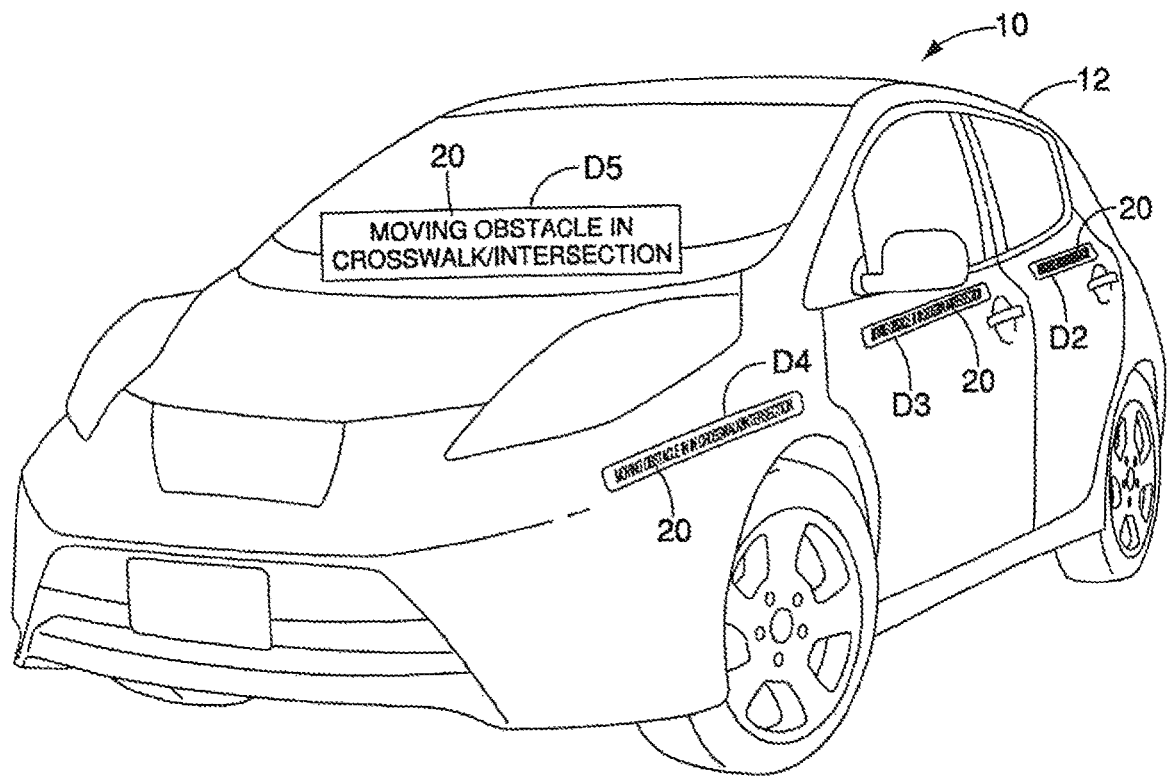
FIG. 10 is a front perspective view of the host vehicle illustrated in FIGS. 1 to 9 displaying a sixth example of the rationale indicator on the displays.

As stated previously, the controller 16 is programmed to determine whether the external object P that is detected is located within or adjacent the travel path 24 of the vehicle 10. For example, the external object P1 illustrated in FIG. 3 is an example of an obstacle in the travel path 24 of the vehicle 10. The external object P illustrated in FIG. 4 is an example of a potential obstacle in the travel path 24 of the vehicle 10. In the illustrated embodiment, the travel path 24 of the vehicle 10 is an area within the detection range R of the vehicle 10 that is in the direction of the vehicle 10 traveling path. In the illustrated embodiment, the travel path 24 is approximately the width of the vehicle 10. If the vehicle 10 is traveling straight forward, then the travel path 24 includes the area that is within the detection zone Z1 and includes the width of the vehicle 10, as seen in FIG. 2. If the vehicle 10 is traveling in reverse, then the travel path 24 is the area that is within the detection zone Z4 that is rearward of the vehicle 10 and includes the width of the vehicle 10. It will be apparent to those skilled in the art from this disclosure that the travel path 24 of the vehicle 10 will vary depending on the type and size of the vehicle 10 and depending on the direction of vehicle travel. The travel path 24 can be in a straight line to correspond to a vehicle that is traveling in a straight line, or it can be curved to correspond to a vehicle that is turning or changing lanes.

Thus, the controller 16 is programmed to display the rationale indicator 20 on the displays D1-D8 upon determining that the external condition is a state in which the external object P is an obstacle in the travel path 24 of the vehicle 10, the rationale indicator 20 being indicative of the state. Additionally, as seen in FIG. 4, the controller 16 is programmed to display the rationale indicator 20 on the displays D1-D8 upon determining that the external condition of the vehicle surroundings includes a state in which the external object P is an obstacle approaching the travel path 24 of the vehicle 10. The controller 16 is further programmed to display the rationale indicator 20 on the display upon determining that the external condition of the vehicle surroundings includes a state in which the external object P is an obstacle adjacent the travel path 24 of the vehicle 10, as seen in FIG. 3 (external object P2) and FIG. 4.

Figure 13:
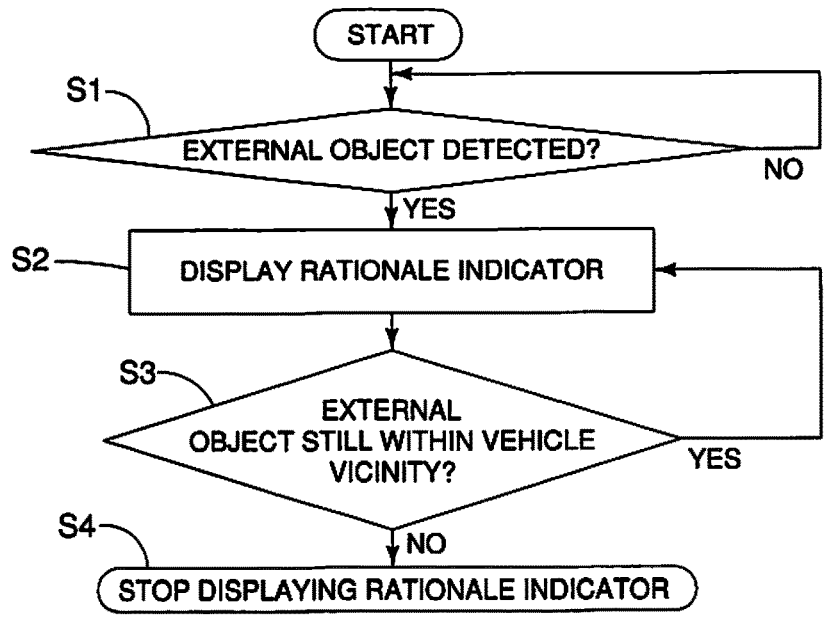
FIG. 13 is a flow chart illustrating a decision making process of the controller of the host vehicle illustrated in FIGS. 1 to 11.

Now referring to FIGS. 13-17, the decision making algorithms of the controller 16 will now be discussed with respect to various scenarios. FIG. 13 illustrates a first scenario in which the detectors 14A, 14B, 14C and 14D are undergoing ongoing detection of external objects P within the vicinity of the vehicle 10. In the first scenario, in step S1, the controller 16 determines whether any one of the detectors 14A, 14B, 14C and 14D has detected an external object P within the vicinity of the vehicle 10. If the controller 16 determines no, the detectors 14A, 14B, 14C and 14D will continue detection of the vehicle vicinity. If the controller 16 determines yes, at step S2, the controller 16 will send a command signal to one or more of the displays D I-D8 to display the rationale indicator 20 to convey that the external object P is in the vicinity of the vehicle 10. The detectors 14A, 14B, 14C and 14D are configured to undergo ongoing detection of the vicinity of the vehicle 10 and are configured to send ongoing detection information to the controller 16.

At step S3, the controller 16 determines whether the external object P is still within the vicinity of the vehicle 10. If the controller 16 determines yes, the controller 16 returns to step S2 and continues to display the rationale indicator 20. If the controller 16 determines no, the controller 16 sends a command signal to the displays D1-D8 to stop displaying the rationale indicator 20 at step S4.

Figure 14:
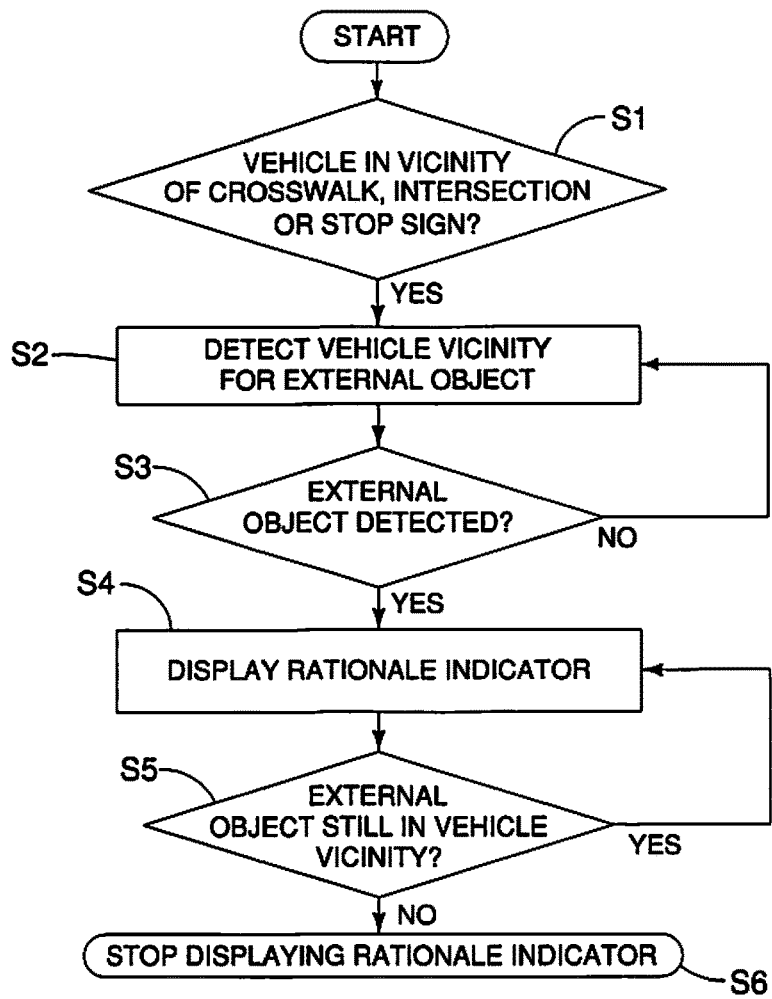
FIG. 14 is a flow chart illustrating a decision making process of the controller of the host vehicle illustrated in FIGS. 1 to 11 in which the detection of external objects is triggered upon the vehicle approaching a crosswalk, intersection or stop sign.

FIG. 14 illustrates a second scenario in which the detectors 14A, 14B, 14C and 14D are triggered to detect the vehicle vicinity based on vehicle location information transmitted to the controller 16 from the vehicle location positioning system 18. As stated previously, the detectors 14A, 14B, 14C and 14D can be triggered upon a determination that the vehicle 10 is in the vicinity of a crosswalk CW, intersection I or stop sign SS. In step S1, the controller 16 determines whether the vehicle 10 is in the vicinity of the crosswalk CW or intersection I or stop sign SS based on information received from the vehicle location positioning system 18. If yes, the controller 16 sends a command signal to the detectors 14A, 14B, 14C and 14D to detect for the presence of an external object P in step S2. Based on information transmitted by the detectors 14A, 14B, 14C and 14D to the controller 16, the controller 16 determines whether an external object P is within the vicinity of the vehicle 10 in step S3. If yes, the controller 16 sends a command signal to the displays D1-D8 to display the rationale indicator 20 relating to the external object P in step S4. If no external objects P are detected, the detectors 14A, 14B, 14C and 14D will continue detection. The controller 16 then determines whether the external object P is still within the vicinity of the vehicle 10 based in information transmitted from the detectors 14A, 14B, 14C and 14D in step S5. If the answer is yes, the controller 16 returns to step S4 and continues to display the rationale indicator. If the answer is no, the controller 16 sends a command signal to the displays D1-D8 to stop displaying the rationale indicator 20 in step S6.

Figure 15:
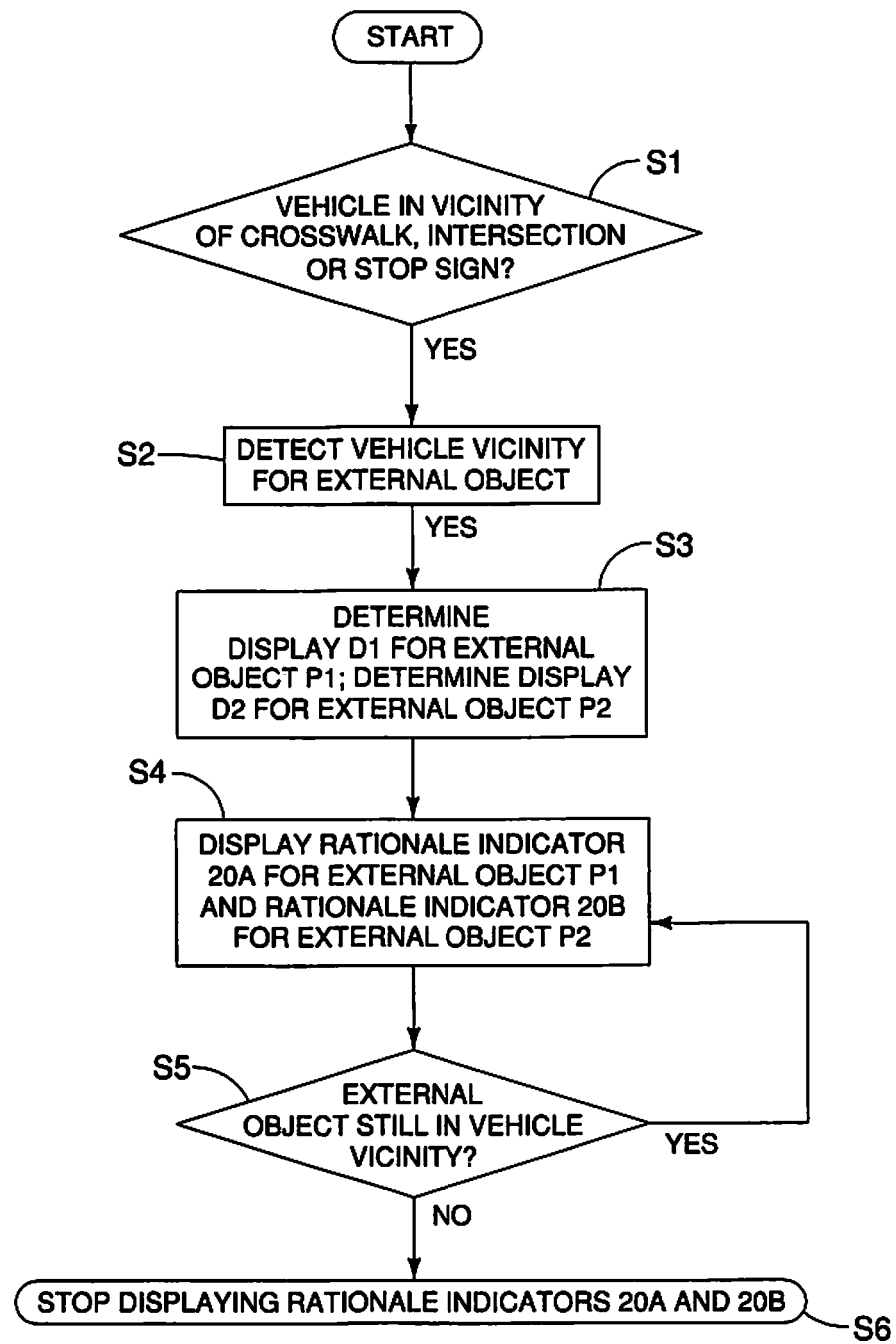
FIG. 15 is a flow chart illustrating a decision making process of the controller of the host vehicle illustrated in FIGS. 1 to 11 of the host vehicle illustrated in FIGS. 1 to 11 in which the controller selectively displays different rationale indicators on different displays.

FIG. 15 illustrates a third scenario in which a plurality of external objects P are detected by the detectors 14A, 14B, 14C and 14D and the detectors 14A, 14B, 14C and 14D are conducting ongoing detection of the vicinity of the vehicle 10. Specifically, in this scenario, two external objects P1 and P2 are in this example. It will be apparent to those skilled in the art that a various number of external objects P can be detected. In step S1, the controller 16 determines whether the external objects P are in the vicinity of the vehicle 10. If the answer is yes, the controller 16 determines the location of a first external object P1 and a second external object P2 in step S2. The controller 16 then determines the first display D1 to display the first rationale indicator 20A for the external object P1, and the second display D2 to display the second rationale indicator 20B for the external object P2 in step S3. That is, the controller 16 determines which of the displays D1-D8 will display the first rationale indicator 20A for the first external object P1 and which of the displays D1-D8 will display the second rationale indicator 20B for the second external object P2. The controller 16 then commands the displays to display the respective rationale indicators 20A and 20B in step S4. The controller 16 then determines whether the external objects P1 and P2 are still within the vicinity of the vehicle 10 in step S6. If yes, the controller 16 commands the displays to display the respective rationale indicators 20 in step S5. If no, the controller 16 commands the display to stop displaying the rationale indicators 20A and 20B in step S6.

Referring briefly to FIG. 3, the controller 16 can select the display D1 to display the rationale indicator 20A regarding the external object P1 on for the remote party 22A that is rearward of the vehicle 10. The controller 16 can select the display D2 to display the rationale indicator 20B regarding the external object P2 for the remote party 22B that is adjacent to the vehicle 10. The vehicle 10 can also display a different rationale 20B indicator for the external object P on the D. Thus, in the third scenario, the controller 16 is programmed to select the first display based on a determination that the external object P is substantially within an obstructed viewing area from the perspective of the remote party 22.

Figure 16:
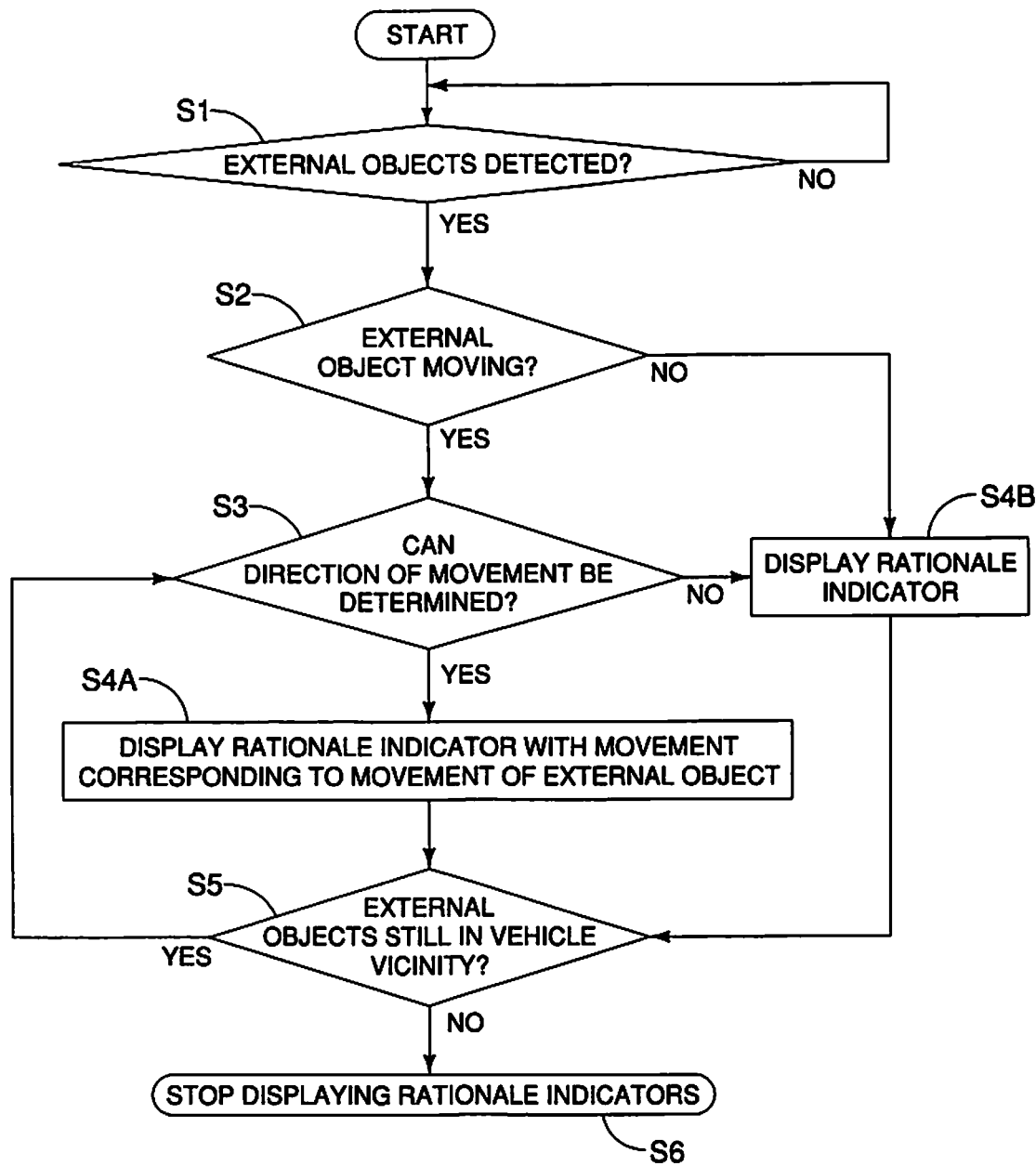
FIG. 16 is a flow chart illustrating a decision making process of the controller of the host vehicle illustrated in FIGS. 1 to 11 in which a moving external object is detected.

Referring to FIG. 16, a fourth scenario is illustrated in which the external object P is moving. In step S1, the controller 16 determines whether the external object P is in the vicinity of the vehicle 10 based on a detection result from the detectors 14A, 14B, 14c and 14D. If the answer is no, the detectors 14A, 14B, 14C and 14D will continue detection of the vehicle vicinity. If the answer is yes, the system moves to step S2. In step S2, the controller 16 determines whether the external object P is moving. If the external object is moving, the controller 16 determines whether the direction of movement of the external object P can be determined in step S3. If the answer is yes, the controller 16 sends a command signal to the displays D1-D8 to display the rationale indicator 20 corresponding to the movement of the external object P in step S4A. For example, as shown in FIG. 11, the rationale indicator 20 can be an icon 28 of a pedestrian walking with the icon 28 moving along the direction of movement. If the pedestrian is passing from the left to the right of the vehicle 10, the displays D1-D8 can display the icon 28 moving from left to right. However, if the external object P is not moving, or if the direction of movement of the external object cannot be determined, the controller will command the displays D1-D8 to simply display the rationale indicator in step S4B. In step S5, the controller 16 determines whether the external object P is still within external object P is still within the vicinity of the vehicle 10. If the controller 16 determines no, the controller 16 will command the displays D1-D8 to stop displaying the rationale indicator 20 in step S6. If the controller 16 determines yes, the process returns to step S3.

Figure 17:
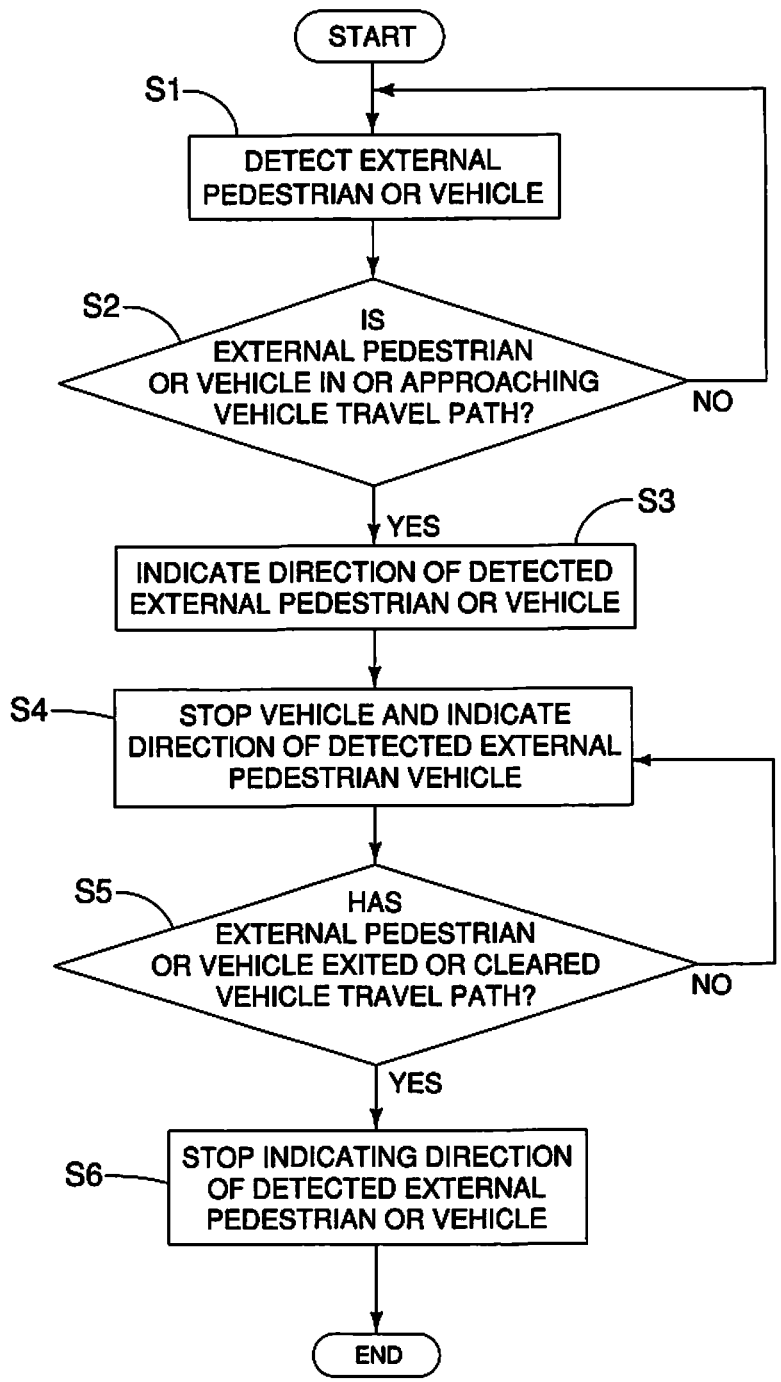
FIG. 17 is a flow chart illustrating a decision making process of the controller of the host vehicle illustrated in FIGS. 1 to 11 in which the controller is programmed to display a rationale indicator for a pedestrian or vehicle in a travel path of the vehicle.

The various scenarios above are examples of programming for the controller 16. It will be apparent to those skilled in the art from this disclosure that the controller 16 can be programmed to conduct all of the steps discussed above, or a combination of the steps as need and/or desired. For example, as seen in FIG. 17, the controller 16 can be programmed to command the detectors 14A, 14B, 14C and 14D to detect for specific types of external objects P, such as detecting specifically for remote vehicles and pedestrians. The controller 16 can also be programmed to determine that the vicinity of the vehicle 10 is the travel path 24, and is also programmed to determine whether the pedestrian or remote vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiments, the following directional terms "forward", "rearward", and "above", as well as any other similar directional terms refer to those directions of a vehicle equipped with the vehicle state indication system. Accordingly, these terms, as utilized to describe the present invention should be interpreted relative to a vehicle equipped with the vehicle state indication system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An autonomous vehicle comprising:
    a vehicle body;
    at least one detector configured to detect a presence of an external object within a vicinity of the vehicle;
    at least one display supported exteriorly on the vehicle body; and
    at least one controller programmed to determine the presence of the external object upon detection of the external object by the detector and to display a rationale indicator on the display to a remote party within the vicinity of the vehicle based on a detection result of the at least one detector indicating the presence of the external object, the rationale indicator being an indication of a presence of an external object that is detected to be in the vicinity of the vehicle.

2. The autonomous vehicle according to claim 1, further comprising
    a vehicle location positioning system in communication with the at least one controller, the at least one controller being programmed to determine that the vehicle is in proximity to at least one of an intersection and a crosswalk based on a vehicle location provided by the vehicle location positioning system, the detector being initiated upon approaching at least one of the intersection and the crosswalk.

3. The autonomous vehicle according to claim 1, wherein the at least one detector is configured to undergo continuous detection of the vicinity of the vehicle to determine the presence of the external object upon starting the autonomous vehicle.

4. The autonomous vehicle according to claim 1, wherein the at least one detector is configured to detect a plurality of external objects within the vicinity of the vehicle upon starting the autonomous vehicle.

5. The autonomous vehicle according to claim 1, wherein the at least one controller is programmed to display the rationale indicator on the display upon determining that the external condition is a state in which the external object is an obstacle in a travel path of the vehicle, the rationale indicator being indicative of the state.

6. The autonomous vehicle according to claim 1, wherein the at least one controller is programmed to display the rationale indicator on the display upon determining that the external condition of the vehicle surroundings includes a state in which the external object is an obstacle approaching a travel path of the vehicle, the rationale indicator being indicative of the state.

7. The autonomous vehicle according to claim 1, wherein the at least one controller is programmed to display the rationale indicator on the display upon determining that the external condition of the vehicle surroundings includes a state in which the external object is an obstacle adjacent a travel path of the vehicle, the rationale indicator being indicative of the state.

8. The autonomous vehicle according to claim 1, wherein the at least one display includes a plurality of displays supported on the vehicle body.

9. The autonomous vehicle of claim 8, wherein the at least one controller is programmed to display at least one image on the display indicative of an external condition to convey the rationale of the rationale indicator.

10. The autonomous vehicle according to claim 8, wherein the at least one controller is programmed to display lights on the display in a direction along the display screen that corresponds to a direction of movement of the external object on the display.

11. The autonomous vehicle according to claim 10, wherein the at least one controller is programmed to display the lights with a plurality of colors.

12. The autonomous vehicle according to claim 8, wherein the at least one controller is programmed to display a moving image on at least one of the plurality of displays corresponding to a movement of the external object as the rationale indicator.

13. The autonomous vehicle according to claim 8, wherein the plurality of displays includes a first display being configured to display a first rationale indicator, and a second display being configured to display a second rationale indicator that is different from the first rationale indicator.

14. The autonomous vehicle according to claim 13, wherein the controller is programmed to simultaneously display the first rationale indicator on the first display and the second rationale indicator on the second display.

15. The autonomous vehicle according to claim 1, wherein
the at least one display is located on area of the vehicle body visible to the remote party that includes at least one of another driver, a pedestrian, and a cyclist within the vicinity of the vehicle as the remote party.

16. The autonomous vehicle according to claim 1, wherein
the at least one detector configured to detect a at least one of another driver, a pedestrian, and a cyclist within the vicinity of the vehicle as the external object.

17. An autonomous vehicle comprising:
a vehicle body;
at least one detector configured to detect a presence of an external object within a vicinity of the vehicle;
a plurality of displays supported at various exterior locations of the vehicle body; and
at least one controller programmed to determine the presence of the external object upon detection of the external object by the at least one detector and to display a rationale indicator that indicates the presence of the external object to a remote party on at least a first display of the plurality of displays, the controller being further programmed to select the first display based on a determination that the external object is substantially within an obstructed viewing area from the perspective of the remote party.

18. The autonomous vehicle according to claim 17, wherein
the at least one controller is programmed to display the rationale indicator on the first display to convey a condition of the obstructed viewing area to the remote party.

* * * * *